Figure 1:
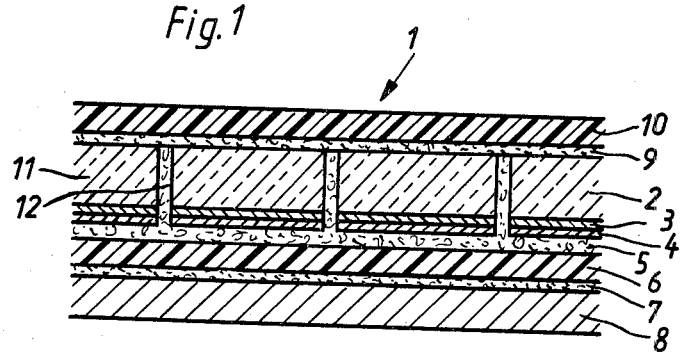

United States Patent

Schwab

[11] 4,229,077
[45] Oct. 21, 1980

[54] GLASS MIRROR PLATE

[75] Inventor: Kurt Schwab, Innsbruck, Austria

[73] Assignee: D. Swarovski & Co., Wattens, Austria

[21] Appl. No.: 913,504

[22] Filed: Jun. 7, 1978

[30] Foreign Application Priority Data

Jun. 13, 1977 [DE] Fed. Rep. of Germany ....... 2726530

[51] Int. Cl.³ ........................... G02B 5/10; G02B 7/18
[52] U.S. Cl. .................................... 350/293; 350/310
[58] Field of Search .............. 350/292, 243, 296, 299, 350/61, 65, 67, 103, 310; 126/270, 271

[56] References Cited

U.S. PATENT DOCUMENTS

| | | | |
|---|---|---|---|
| 1,890,166 | 12/1932 | Shatto et al. | 350/310 |
| 2,294,940 | 9/1942 | Skolnik | 350/310 |
| 2,707,903 | 5/1955 | Trombe | 350/292 |
| 3,541,825 | 11/1970 | Reader et al. | 350/320 |
| 3,912,380 | 10/1975 | Klein | 350/310 |
| 4,035,065 | 7/1977 | Argoud et al. | 350/310 |
| 4,038,971 | 8/1977 | Bezborodko | 350/292 |
| 4,124,277 | 11/1978 | Stang | 350/310 |

FOREIGN PATENT DOCUMENTS

| | | |
|---|---|---|
| 1191766 | 2/1966 | Fed. Rep. of Germany . |
| 2152642 | 4/1973 | Fed. Rep. of Germany . |
| 2255268 | 5/1974 | Fed. Rep. of Germany . |
| 2628418 | 1/1978 | Fed. Rep. of Germany ........... 350/310 |

Primary Examiner—Jon W. Henry
Attorney, Agent, or Firm—Neuman, Williams, Anderson & Olson

[57] ABSTRACT

A glass mirror plate and a method for its production is described. The glass mirror plate is characterised by a layer structure consisting of at least a glass layer, a reflective layer, a gummed layer and a supporting plate. The glass layer can be subdivided into single elements or can consist of a pliable glass film. The glass mirror plates are in particular suitable for concentrating solar collectors.

9 Claims, 3 Drawing Figures

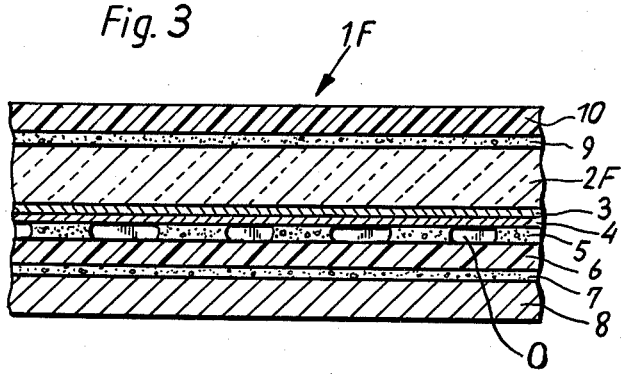

GLASS MIRROR PLATE

This invention relates to a glass mirror plate, a method for its production and to its use.

Non-plane reflective surfaces are required in various fields, e.g. for concentrating solar collectors.

Reflective plastic films are known for such purposes. However, these films exhibit serious disadvantages. In particular their temperature stability and weather resistance are unsatisfactory. In the course of their use their reflective properties deteriorate to a large extent. Reflective plastic films have proved to be unsuitable for use in concentrating solar collectors.

Large reflective glass plates, especially when non-plane-shaped, are difficult to transpost and very liable to breakage.

The object of the invention is to devise a glass mirror plate which can be used in the form of non-plane reflective surfaces, which is easy to produce and transport and which is characterised by a high degree of temperature stability and weather resistance as well as a high level of reflective capacity.

The invention is based on the idea that this object may be solved by devising a pliable glass plate characterised by a layer structure.

The subject matter of the invention is a pliable glass mirror plate characterised by a layer structure consisting of at least a glass layer, a reflective layer, a gummed layer and a supporting plate.

Furthermore, the subject matter of the invention is a method for producing a pliable glass mirror plate wherein a glass layer is provided with a reflective layer and the glass layer provided with the reflective layer is connected to a supporting plate by means of a gummed layer.

Finally, the subject matter of the invention is the use of the glass mirror plates in concentrating solar collectors.

The production of a glass mirror plate in accordance with the invention is easy. The particulars of this point will be dealt with hereinafter. It is especially advantageous that the reflective layer can be applied in a plane state.

The glass mirror plates can be stored and transported flat, difficulties, especially regarding the risk of breakage during transportation and storage, being eliminated.

In production, the glass elements are arranged in an exactly plane position. When the glass mirror plate is curved, the glass elements retain a definite position. For this reason the glass mirror plates exhibit a high level of efficiency even when curved.

The mechanical properties, the resistance to weather and the temperature stability are superior those of reflective plastic films.

The glass mirror plates are pliable and can be fitted to every developable surface developed in a suitable manner.

The glass mirror plate is a self-contained element whereby the penetration of moisture into it and the resulting damage is avoided.

The use of the glass mirror plates is extremely simple because of its structure.

Due to the above-mentioned reasons the glass mirror plates according to the invention are suitable especially for the production of concentrating solar collectors.

Figure 2:
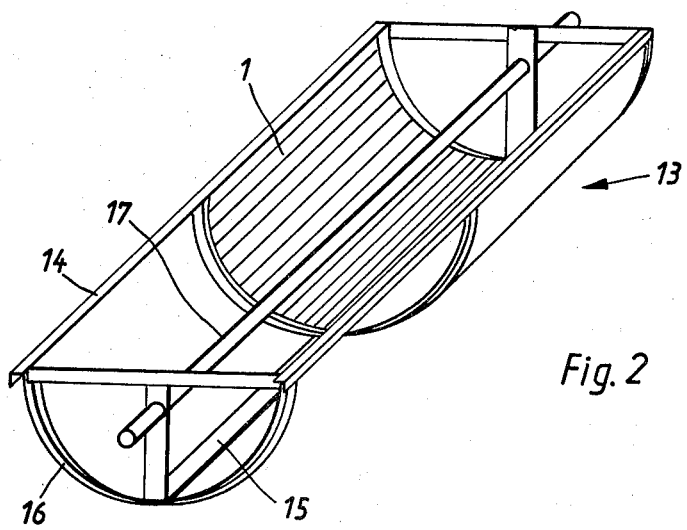

In the following the invention will be explained in greater detail with reference to the drawing which shows exemplary embodiments and in which FIG. 1 shows a section of an embodiment of the glass mirror plate according to the invention;

FIG. 2 shows a solar collector employing a glass mirror plate according to the invention as a reflective layer, and FIG. 3 shows a section of a second embodiment of the glass mirror plate according to the invention employing a glass film.

The glass layer 2 has to be developed in such a manner that it is pliable in order to obtain a total glass mirror plate 1 which is pliable.

According to a preferred embodiment this aim is achieved by constructing the glass layer 2 so that it comprises a large number of single glass elements 11.

The size of the glass elements 11 can be varied within large ranges and depends largely on the use for which it is intended and especially on the desired amount of curvature of the glass mirror plate. It is obvious that it is an advantage to use small glass elements 11 in the case of greater curvature, whereas large glass elements can be used when the amount of curvature is small.

The geometric shape of the glass elements is also variable and depends chiefly on the manner in which the glass mirror plate is intended to be curved in use. The following shapes in particular come into question for the glass elements: strips, rectangles, squares, hexagons, trapezoids and cut out segments of a circle.

Strip-shaped glass elements, i.e. those in the shape of long rectangles, are especially suitable for the use of glass mirror plates in parabolic-cylinder mirrors.

By way of example, the strips have a width of approximately 0.5 to 3 cm and preferably 1 to 2 cm and a length ranging from approximately 10 to 100 cm, and preferably between approximately 15 and 40 cm.

The thickness of the glass films should preferably range from 0.3 to 2 mm and especially from approximately 0.5 to 1 mm. The thickness of the glass elements is restricted to the lower level solely for reasons of cost, since the manufacture of very thin glass plates is difficult and expensive. In principle, there is no confinement of the thickness at the upper level. However, thick glass elements require a greater amount of material and result in higher weight for transport.

The use of a glass, which is weather-resistant is preferred.

In an alternative embodiment the glass layer 2 does not consist of individual glass elements but comprises a pliable glass film as illustrated in FIG. 3. It is noted by comparing FIGS. 1 and 3 that the layered constructions of the two glass plates 1 and 1F are the same insofar as the composition of material of the various layers. It will be noted that glass film 2F is present in the plate 1F of FIG. 3 rather than the strips 2 in plate 1 of FIG. 1.

The production of thin, pliable glass films is known.

The glass films used must be pliable as required for the intended curvature of the glass mirror plate. Glass films having a thickness ranging from approximately 0.1 to 0.5 mm are suitable. In this regard the quality of the glass has to be taken into consideration, as the pliability of the glass depends on its composition. In theory, there is no lower limit as regards the thickness of the glass film. It may, for example, amount to only a few $\mu$m. The manufacture of very thin glass films is, however, costly so that the thickness of the glass films used depends among other things on economic aspects.

Thermally or chemically prepared or pre-stressed glass is especially suitable for large curvatures. Such methods for improving the pliability of glass are known.

The reflective layer 3 is applied in the usual manner to the glass layer 2. The application of a thin silver layer in the known manner or the high vacuum coating with aluminium are suitable embodiments.

Instead of the usual mirror coating a reflective metal film can be adhered to the glass layer 2.

If a glass film is used for the glass layer 2 in the manufacture of large glass mirror plates, which are intended to be curved to a high degree, the reflective layer may become detached because of possible weak adhesion between the reflective layer and the glass film.

This detachment can, however, be avoided if, according to a preferred embodiment, the reflective layer is subdivided.

By virtue of the subdivision of the reflective layer, it can be achieved that the latter, even in the case of large curved surfaces, does not become separated from the glass layer. In the narrow areas, in which no reflective layer is provided, the gum of the gummed layer 5 comes into direct contact with the glass layer. The reduction of the reflection values caused by not coating the narrow interspaces with a reflective layer can be disregarded.

The subdivision of the reflective layer can be carried out in several ways. The reflective areas may, for example, be situated beside one another in the form of rectangles, squares, hexagons (honeycomb pattern), trapezoids or cut out segments of a circle. The size of the reflective areas depends for the most part on the adhesion existing between the reflective layer and the glass layer, and on the curvature of the glass mirror plate. In the case of poor adhesion and a high degree of curvature a fine subdivision is intended. Measurements between 0.5 and 25 cm, in particular between 2 and 10 cm, are suitable for rectangular or square areas coated with a reflective layer.

The distances between the separate segments coated with a reflective layer may be extremely small. In this case, however, it must be ensured that the individual areas are isolated. Thus, the distance may amount to only a few μm. It is, however, intended to provide a somewhat larger distance so that the gum is in direct contact with the glass layer to a sufficient degree. Therefore, the distances ranging from particularly approximately 0.05 to 2 mm and preferably from 0.1 to 1 mm come into question.

The application of the reflective layer in discontinued areas can be carried out in various ways. The choice of a suitable method depends on the manner in which the reflective layer is applied and on the width of the bridges situated between the reflective areas.

In the case of the application of the reflective layer by high vacuum coating, the use of a cover grating is preferred for example. Then only the areas of the glass layer not covered by the grating are coated with a reflective layer.

In the case of the application of a reflective layer, e.g. of a silver layer according to the wet process, it is preferred to apply a parting compound in the bridge areas. This can, for example, be carried out by means of screen printing or cylinder printing. Alternatively, a grating consisting of a suitable adhesive may be applied.

Another possible method is to first steadily apply the reflective layer and then to remove the bridge areas. This can be carried out either according to a mechanical, e.g. scraping, or chemical method. In the latter case, a coating lacquer is applied to the continuously reflective layer in such a manner that the bridges remain free. This can, for example, again be carried out by means of screen printing or cylinder printing. Then the rflective layer in the bridge areas is eliminated.

The reflective layer 3 is preferably provided with a protective layer 4, normally a lacquer layer.

A gummed layer 5 is applied to the protective layer 4 or, alternatively directly to the reflective layer 3. The gummed layer 5 serves the function of connecting the glass layer to the supporting plate 8. The choice of the gum of the gummed layer 5 depends on the materials to be combined. The gummed layer 5 may be self-adhesive, activated by heat or activated in another manner. The gummed layer 5 should preferably comprise a pliable gum. Silicon rubber, acrylate resins, epoxy resins and asphalt are examples for gums.

If individual glass elements are used of suitable the glass layer 2 the gum of the gummed layer 5 should preferably penetrate into spaces 12 between the individual glass elements 11. It is preferred that the gum should completely fill the spaces 12, however, without projecting beyond them.

The gummed layer 5 should be evenly distributed. Only in the case of an exactly plane and parallel embodiment and arrangement of the individual layers can optimum efficiency be achieved.

The thickness of the gummed layer 5 should range preferably from approximately 0.05 to 1 mm and in particular from 0.1 to 0.5 mm.

According to a preferred embodiment, especially when a glass film is used as the glass layer, the gummed layer 5 is not applied continuously to the total area but to discrete areas. It is of particular advantage to apply the gummed layer 5 in the form of a grating or punctiform. Thus, in FIG. 3 openings 0 are disposed in gummed layer 5. In the case of this embodiment it is also possible to apply the gummed layer continuously to the outer areas of the glass plate, i.e. to provide a sort of edge sealing. This method of applying the gummed layer has the advantage that little gum is necessary and that gums, which do not harden well, can also be used. Finally, the elasticity of the glass mirror plate is improved in this manner.

The gummed layer may be left to harden in a curved state, i.e. in approximately the same shape as that of the glass mirror plate when put to its intended use. Thus it can be achieved that fewer tensions are to be expected when it is in use. The glass mirror plates may, however, be stored and transported flat.

Since, on the one hand, pliable gums are expensive and, on the other hand the evenly distributed application of a gummed layer having the above-mentioned thickness is not easy, it is possible to arrange a pliable layer 6 having an adhesive layer 7 between the, in this case, very thin gummed layer 5 and the supporting plate 8. In the case of this embodiment the gummed layer 5 serves only to connect the glass layer to the pliable layer, the elasticity desired for balancing temperature tensions and for increasing the shock resistance being provided by the pliable layer 6.

The pliable layer 6 may comprise a thin rubber, plastic or foam film. A suitable thickness lies in the range of approximately 0.05 to 2 mm and in particular in the range of 0.2 to 0.5 mm.

The pliable layer 6 is connected to the supporting plate by means of an adhesive layer 7 comprising a suitable adhesive, which guarantees the secure adhesion of both layers. The adhesive layer 7 can, however, be omitted if the pliable layer 6 can be heat-sealed to the supporting plate.

The support 8 comprises a pliable plates. Steel plate, aluminium plates and thin plastic plates are especially suitable. The thickness may, depending on the material, range for example between 0.1 to 0.5 mm. Flexible plates are preferred.

For the production of the glass mirror plates according to the invention which will be dealt with in greater detail in the following as well as, if necessary, for their protection in storage and transportation, a covering layer 10 may be provided on the upper side of the glass layer 2 by means of an adhesive layer 9.

The covering layer 10 should preferably comprise a pliable film material, in particular one made of plastic, e.g. polyethylene or polypropylene, or paper.

The adhesive layer 9 may comprise any suitable material which ensures adhesion between the covering layer 10 and the glass layer 2. The connection between the covering layer and the glass layer should, however, be detachable. The adhesive layer 9 may for example be applied as a self-adhesive layer to the covering layer 10 so that the covering layer can be connected to the glass layer 2 in a simple manner.

From the point of view of costs as well, however, adhesives, which are soluble in water, come into question as a material for the adhesive layer 9. These have, furthermore, the advantage that they can be removed simply and completely from the glass layer 2.

According to a preferred embodiment of the invention the glass mirror plate is produced in the following manner:

Glass elements in the form of strips, which have already been provided with a reflective layer and preferably with a protective layer, are laid beside one another on a plane plate with a slight distance between them and with the reflective layer facing downwardly. The distance between the individual elements can, for example, be between 0.1 and 2 mm, preferably between 0.5 and 1 mm. The supporting plate with suitable means to achieve exact distancing, e.g. perpendicular metal strips of a suitable thickness and standing upwards arranged in two rows along the side of the supporting plate. The glass strips are laid between them. After the glass strips have been laid it is adviseable to check the quality and position of the individual strips. This can be carried out with the naked eye or by means of a suitable measuring process.

After being checked and after individual elements have, if necessary, been exchanged the covering layer with the adhesive layer is laid on top of the glass strips.

After this the layer structure is removed from the supporting plate with the aid of a further plate if necessary. If further hardening of the gum or adhesive layer is necessary the layer structure is left in position until this has been accomplished.

The layer structure is then laid flat having the covering layer downwards and the reflective layer upwards and the gummed layer is applied. In this case care must first of all be taken that the spaces between the glass elements are filled with gum. This can be accomplished by cylinder or screen application. Then the gummed layer is applied evenly. As previously explained, the gummed layer may be very thin and the pliable layer with adhesive layer may be provided in addition.

The supporting plate is affixed to the gummed layer or, in the case of a pliable intermediary layer, to the adhesive layer.

Alternatively, the adhesive layer may also be provided on the supporting plate or a heat seal can be carried out between the pliable layer and the supporting plate.

It is obvious to the specialist that alternative methods come into question for the manufacture of the glass mirror plates according to the invention. The reflective layer and the covering layer need, for example, not be applied to the glass layer until later.

The glass mirror plates according to the invention are suitable for various purposes of application. The glass mirror plates are pliable, they may, however, be transported flat without running the risk of breakage or damage.

One of the ranges of application is, for example, their use in the manufacture of traffic mirrors.

Glass mirror plates are, however, particularly suitable for concentrating solar collectors. Concentrating solar collectors for example in the shape of parabolic-cylinder mirrors are attaining increasing importance due to the energy shortage.

It is known to produce solar collectors of metallized plastic material. These solar collectors, however, have low reflection values. In addition, the reflecting power decreases considerably in the course of time due to environmental influences.

It is furthermore known to line solar collectors with mirror-coated glass. The use of mirror-coated glass has resulted in good reflection values, however, a number of serious disadvantages must be tolerated. The production of parabolically curved glass plates, which are to line troughlike solar collectors, is difficult and therefore not economical. The parabolic curvature of the glass plates must be effected by means of thermic deformation. The mirror coating of the curved glass troughs is complicated, cannot be carried out continuously and thus results in high costs. The troughlike glass collectors cannot be stacked due to their given shape, are difficult to transport and are liable to break very easily.

The foregoing disadvantages can be eliminated in an elegant manner by using glass mirror plates according to the provided invention to line solar collectors.

The glass mirror plate may be transported in a plane arrangement easily and without the risk of breakage. The manufacture of the disclosed plates is extremely easy and economical. Due to their pliability the glass mirror plates may be placed simply on the spot and without thermic treatment into troughlike solar collectors for example. On-the-spot installation requiring a large amount of work is not necessary. Due to the industrial production of the glass mirror plates, constant quality is guaranteed with the result that the highest requirement are met as regards qualities such as mechanical qualities, weather resistance and resistance to aging. Compared with the plastic films, glass mirror plates have superior reflection capacity, superior weather resistance, resistance to scratching (by quicksand) and superior cleaning possibilities.

A concentrating solar collector lined with the glass mirror plates according to the invention is illustrated by FIG. 2.

The collector trough 13, as an example, may consist of a strut construction of metal or plastic. The glass mirror plate 1 is inserted into this trough. This may be carried out simply by shoving the glass mirror plate under one of the fastening strips 14 and by pressing it downwards until the other side locks below the other fastening strip 14. The glass mirror plate then rests upon the parabolic frame member 16 and thus attains the desired parabolic curvature.

Several glass mirror plates may be used for large solar collectors. The areas of impact between the plates then lie on suitably constructed frame members 16 and, if necessary, on a seating shoulder 15. The spaces between the individual plates may be jointed with a suitable material, e.g. silicon rubber. The absorber tube 17 is represented diagrammatically by the drawing.

The frame members 16 are preferably a T-profile as a support for the glass mirror plates, and in order to increase rigidity. They may, for example, be made of moulded aluminium. The frame members are connected rigidly to the fastening strips 14, e.g. screwed together. The strut construction produces the necessary measuring accuracy and twisting rigidity and may be constructed from the individual parts simply and on the spot.

The use of glass mirror plates is not restricted to parabolic-cylinder mirrors. They may, as an example, be also used for the manufacture of circular parabolic mirrors.

I claim:

1. A solar collector comprising a curved supporting framework; a pliable mirror plate for mounting on said framework comprising a pliable glass film layer, a reflective layer disposed on one surface of said glass film layer, and a gummed layer disposed on said reflective layer; said pliable mirror plate also including a flexible supporting plate supportably underlying said pliable mirror plate; said pliable mirror plate being mounted on said curved supporting framework.

2. A pliable glass mirror plate according to claim 1, wherein a protective layer is provided on the reflective layer.

3. A pliable glass mirror plate according to claim 1 wherein said gummed layer comprises a resilient gum.

4. A pliable glass mirror plate according to claim 1 wherein said gummed layer is discontinuous.

5. A pliable glass mirror plate according to claim 1 wherein said supporting plate consists of a flexible metal or plastic plate.

6. The pliable mirror plate of claim 1, in combination with a pliable layer interposed said gummed layer and said supporting plate; said pliable layer having an adhesive layer thereon engaging said supporting plate.

7. A pliable glass mirror plate according to claim 6 wherein said pliable layer is a member selected from the group consisting of rubber, plastic and foam films.

8. A pliable glass mirror plate according to claim 1, wherein a covering layer having an adhesive layer is arranged on said glass layer with said adhesive layer in engagement with a surface of said glass layer oppositely disposed to said reflective layer.

9. A pliable glass mirror plate according to claim 8 wherein said covering layer comprises a plastic or paper film.

* * * * *